F. E. WILLIAMSON.
ALTERNATING ROTARY GEARING.
APPLICATION FILED NOV. 26, 1921.
1,420,599.
Patented June 20, 1922.
2 SHEETS—SHEET 1.
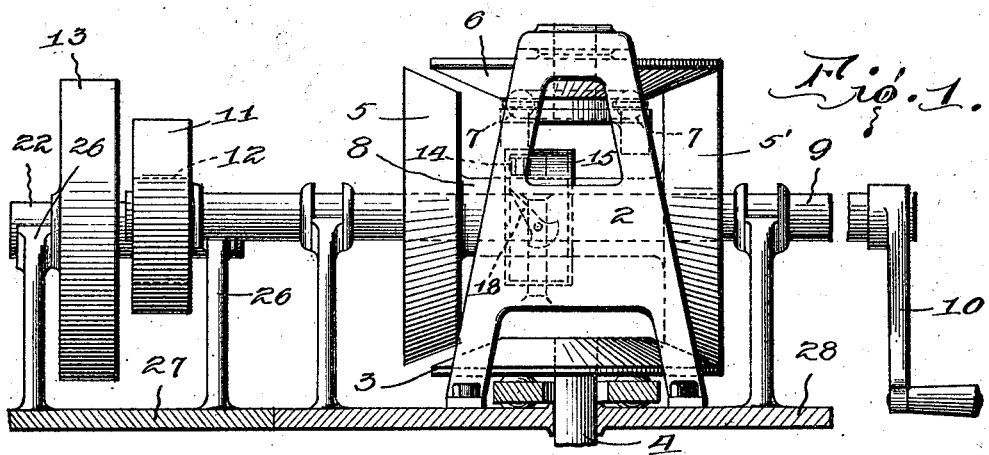
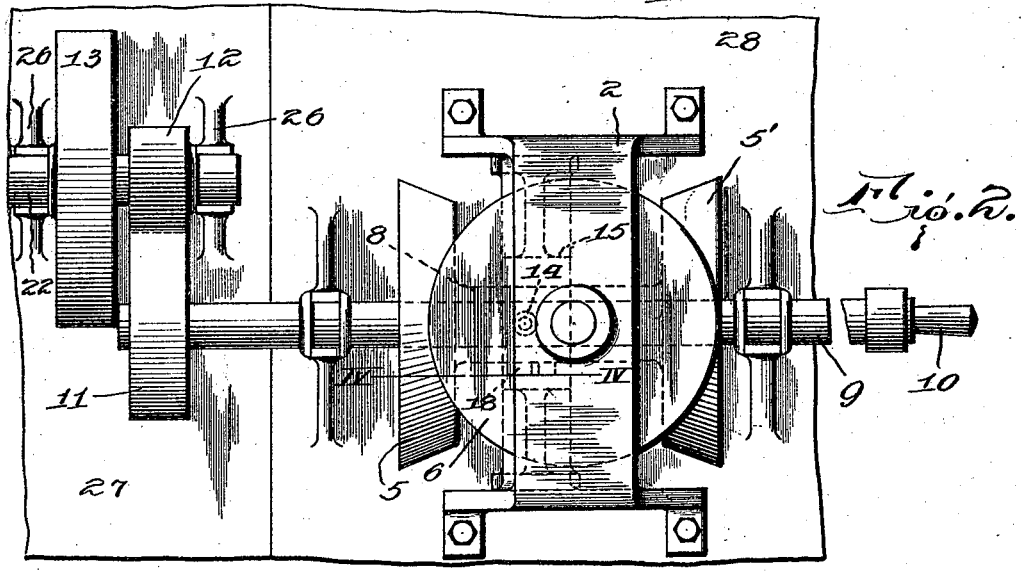
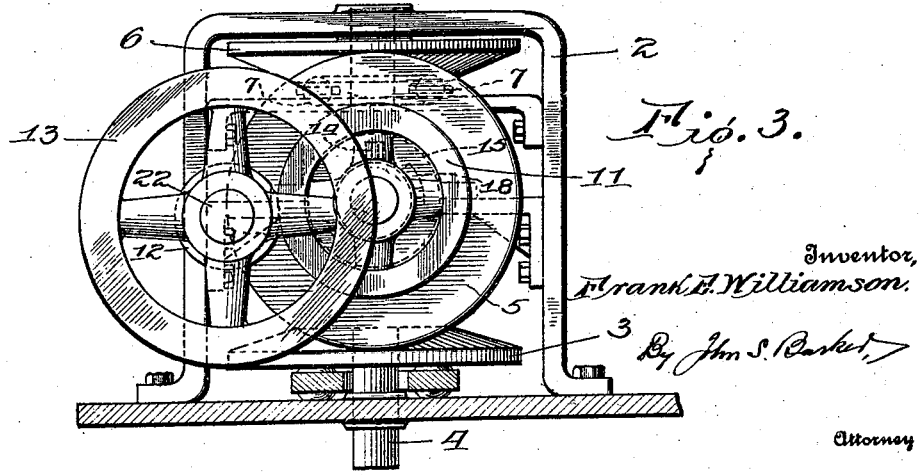
Inventor,
Frank E. Williamson.
By John S. Basket,
Attorney

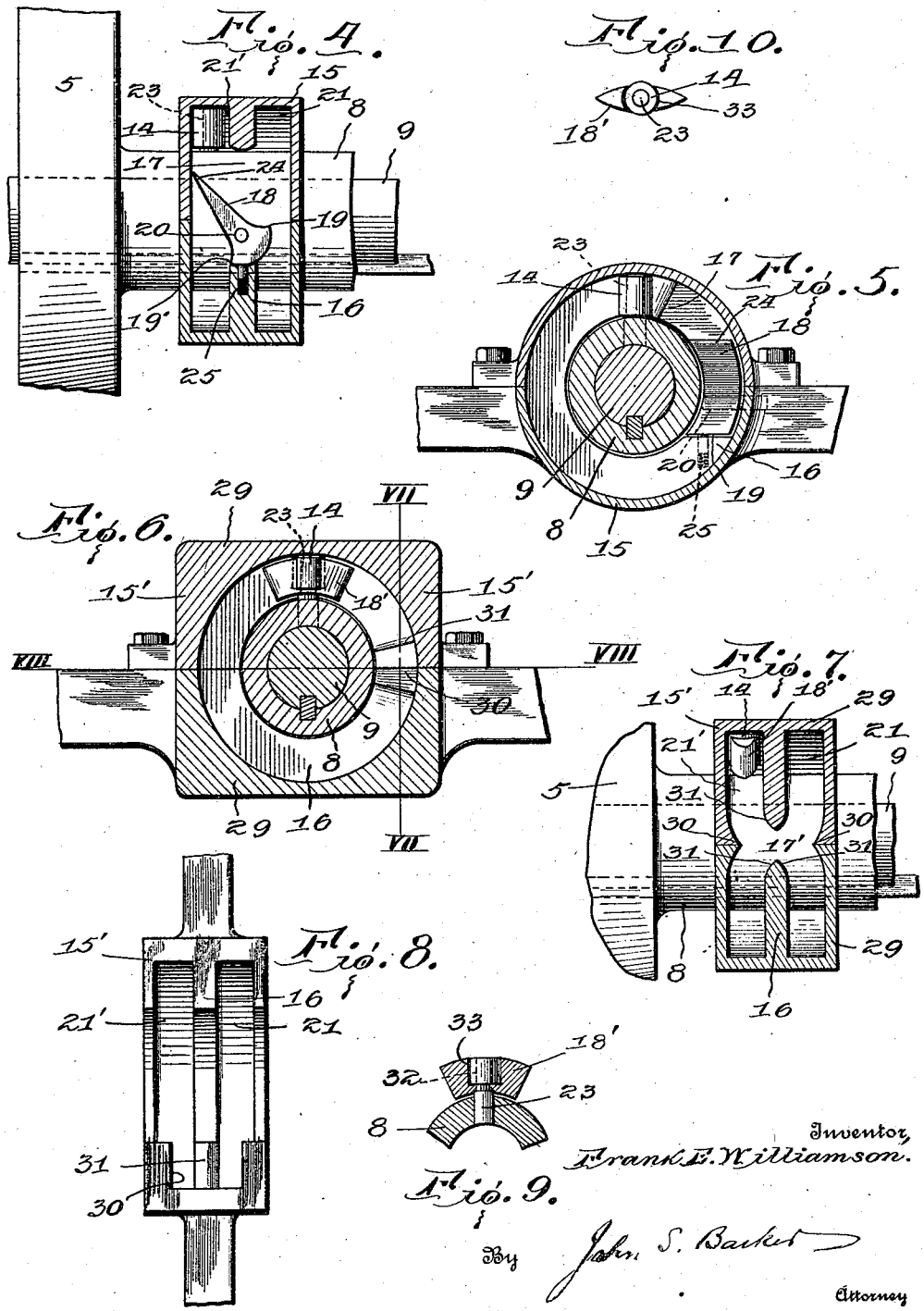

UNITED STATES PATENT OFFICE.

FRANK E. WILLIAMSON, OF GLASCO, KANSAS.

ALTERNATING ROTARY GEARING.

1,420,599.  Specification of Letters Patent.  Patented June 20, 1922.

Application filed November 26, 1921. Serial No. 517,840.

*To all whom it may concern:*

Be it known that I, FRANK E. WILLIAMSON, a citizen of the United States, residing at Glasco, in the county of Cloud and State of Kansas, have invented certain new and useful Improvements in Alternating Rotary Gearing, of which the following is a specification.

My invention relates to alternating rotary gearing, that is to say, gearing adapted to impart a rotary motion to a driven part, which motion is alternately and automatically reversed. Such mechanism is especially adapted for use in connection with washing machines, but it is not limited in its useful applications to such uses.

In the accompanying drawings—

Figure 1 is a side view of a gearing embodying my invention.

Fig. 2 is a top plan view.

Fig. 3 is an end view.

Fig. 4 is a vertical section on the line IV—IV of Fig. 2.

Fig. 5 is a vertical section on the line V—V of Fig. 1.

Fig. 6 is an end view of a different embodiment of my invention from that shown in the views already described.

Fig. 7 is a vertical section on the line VII—VII of Fig. 5.

Fig. 8 is a horizontal section on the line VIII—VIII of Fig. 5.

Fig. 9 is a detail plan view illustrating the preferred form of projection and switch, carried by the revolving shaft, shown in Figs. 6, 7 and 8.

Fig. 10 is an end view of the parts shown in Fig. 9.

Referring to Figs. 1 to 4 of the drawings, 2 indicates a supporting bracket or frame having suitable bearings in which are mounted various parts of the mechanism. In this frame is supported a driven shaft 4, which is represented as being vertically disposed. To this shaft is fixed a bevel wheel 3, and as my invention is shown as embodied in mechanism in which the gears engage with each other frictionally it is provided with a friction working face. A pair of diametrically opposite bevel friction wheels 5, 5', are arranged to engage with and drive the wheel 3. A bevel friction idler wheel 6, suitably mounted in the upper portion of the frame 2, turns upon a support that is in axial alignment with the shaft 4. The wheel 6 is free to revolve on its support and is engaged by either the wheel 5 or 5' at the instant that such wheel comes into engagement with the wheel 3. Its function is to equalize the pressure upon the friction drive wheel on opposite sides of its axis of rotation and to assist in maintaining it in working engagement with the driven wheel 3 and for this purpose it is so supported that its working faces are maintained in fixed relations with the working faces of the wheel 3. The pressure equalizing wheel 6 is supported in part upon rollers 7 which relieve the strain upon its central bearing.

The two driven wheels 5, 5' are rigidly connected with each other by a shaft 8, which in the form of invention herein illustrated is a hollow shaft or sleeve mounted upon a drive shaft 9, to which it is so connected that while being free to slide upon such shaft it will necessarily rotate therewith. The shaft 9 is provided with a crank 10 adapted to serve as the handle by which the apparatus may be hand-driven.

The shaft 9 carries a wheel 11, at the end opposite the driving crank 10, with which engages a pinion 12 supported upon a shaft 22 parallel with the shaft 9. The wheels 11 and 12 are preferably plain faced so as to engage with each other by friction. The shaft 22 carries a fly or balance wheel 13 and is supported in bearings 26. When the apparatus being described is employed to operate a dolly or agitator of a washing machine, supported upon the driven shaft 4, bearings 26 are preferably carried by the tub 27, while the bracket or frame 2 is carried by the cover 28 for the tub. The arrangement of the parts thus far described is such that when they come into working engagement, as represented best in Fig. 3, the axis of shaft 9 is a little above the axis of shaft 22, with the result that the gears 11 and 12 are held in frictional, working, engagement, by the weight of the cover 28 and the parts that it carries. This makes it unnecessary to lift the balance wheel each time the cover is raised, and also insures good working engagement between the driving mechanism and the fly or balance wheel.

The sleeve or hollow shaft 8 is provided with a projection 14, preferably radially disposed and in the form of a roller supported by, and turning freely upon, a pin 23.

A casing 15, suitably supported in the bracket or frame 2, surrounds the portion of the shaft 8 that carries the projection roller 14. It is divided by a central partition 16 so as to form two tracks or ways, 21, 21', around the shaft and on opposite sides of the partition, in which the projection 14 is adapted to travel and by which its position and that of the sleeve shaft 8 upon the drive shaft 9 is determined and maintained. The partition 16 is centrally perforated for the passage of the concentric shafts 8 and 9, and is provided, to one side of the shafts, with an opening 17 constituting a crossover or connecting passage between the tracks 21, 21'. In the opening 17 is located a switch 18, supported upon a pivot 20, and formed with a tongue 24 adapted to lie across either of the tracks 21 or 21', accordingly as the switch is placed, and with a heel shaped to have the projections 19, 19'. These projections are upon opposite sides of the pivot 20, and are so shaped that when the switch is inclined so that its tongue 24 lies across one of the tracks,—say that designated 21'—, one of the projections extends into the opposite track, 21, sufficiently far to be engaged by the projection 14 should it pass that way. When the switch is thrown to its opposite position, with the tongue lying across the track 21, then the other projection 19 lies in the opposite passage 21'.

A spring 25 engages with the switch 18 and holds it in the position to which it may be thrown, with its tongue lying across one or the other of ways or tracks 21, 21'.

The operation of the apparatus is as follows:

The shaft 9 is driven, and in revolving turns the shaft and the two drive wheels 5, 5' carried thereby.

The casing 15 is so located that when the projection 14, revolving with the shaft 8, is in one of the passage ways, 21 or 21', one of the drive wheels, 5 or 5', is then in working engagement with the driven wheel 3, where it is held, because the partition prevents the projection 14 from moving to disengage such gears. Supposing the drive shaft to be turning in the direction indicated by the arrow in Fig. 1 and that the switch 18 lies across the track or way in which the projection 14 is traveling. It will be apparent that the projection will be shifted laterally by the switch when it comes into engagement therewith, and will be caused to pass through the opening 17 and across into the other way or passage. This lateral movement of the projection results in a shifting of the shaft 8, in the direction of its length, and a corresponding lateral movement of the wheels 5, 5' which it carries. Such shifting movements carry that one of the drive wheels which had been driving the wheel 3 out of engagement therewith, and immediately bring the opposite drive wheel into working engagement therewith; and as the two drive wheels engage with the driven wheel on diametrically opposite sides, it follows that the direction of rotation of the shaft 4 will be changed each time the shift described is made. When the projection 14 crosses over from one way to the other it engages with one of the projections 19 on the heel of the switch and shifts the switch from the position shown in full lines in Figs. 4 to that represented in dotted lines, with the result that the point of the switch now lies across the track or way that the projection has just entered. The projection now makes nearly a complete revolution before again coming into engagement with the switch point, to be again deflected transversely and into the opposite track or way, in a manner similar to that just described. Thus it will be seen that the continued rotation of the driving shaft, through the gearing and shifting mechanism described, imparts intermittent alternate rotary motions to the driven shaft 3.

The lateral shifting of the drive gears and their connecting shaft is quickly accomplished so that but a small fractional portion of each revolution of the drive shaft is taken in effecting the shift, the remainder of the revolution being utilized to cause rotation of the driven shaft.

Since it might happen, in making a shift of the gears as described, that the new working engagement of the gears would be effected before the driven parts come to rest prior to reversal, I prefer to make the gears 3, 5, 5' and 6 with friction working faces as described to prevent the stripping of gear teeth or destructive strains upon the mechanism, as well as to avoid the disagreeable sounds incident to the shifting of gears having intermeshing teeth.

The fly or balance wheel 13 serves as a reservoir of stored energy to cause the machine to run smoothly and at approximately uniform speed notwithstanding the changes in direction of rotation of the driven shaft and the strains incident thereto.

The mechanism thus far described is adapted for use in apparatus where the drive shaft is always to be turned in one direction, owing to the formation of the switch 18. Under some situations this limitation is undesirable, particularly in washing machines where some operators prefer to rotate the driving shaft in one direction and others in the opposite direction, and I have therefore, in Figs. 6 to 10, inclusive, illustrated a form of my invention that permits such reversed rotation of the shaft. In these views 15' designates the casing or boxing in which turns the roller projection 14 carried by the shaft or sleeve 8. The boxing is preferably made of two sections 29, 29 adapted to be bolted together and form a tight casing about the shaft 8, in the lower part of which may be a lubricant. The casing is provided with the central partition 16 and has the tracks 21, 21' in which moves the roller 14, the partition having in it the opening 17' forming a crossover passage uniting the tracks 21, 21' as illustrated in Fig. 6. There is no switch, like the switch 18 already described, pivotally supported in the passage 17. Instead, I mount upon the pin 23 a shuttle-shaped switch 18'. 30, 30 designates cam projections located respectively in the tracks 21, 21' opposite the crossover opening 17'. These are arranged to obstruct the tracks at this point and also to act as diverging cams with which the ends of the switch 18 may engage and by which it will be deflected so as to pass diagonally through the opening 17' and enter the opposite track from that in which it had been moving. The cams 30 are also engaged by the roller 14 and operate to shift the shaft 8 and the wheels which it carries laterally. One of the cams will therefore first divert the switch in order to properly direct the movements of the parts, and then immediately shift the shaft 8. As soon as the roller 14 passes beyond the peak of the cam 30 and the leading end of the switch 18' has entered the opposite track from the one it has just left it will cause the roller 14 to move past the central plane of the partition 16, should the inertia of the parts be not sufficient to cause this. Further rotative movements will then bring the switch and roller into the opposite track, in which it will travel until the crossover opening is again reached when the parts will be diverted in an opposite direction to take the first referred to track.

The opposite edges of the partition 16, at the crossover opening 17', are beveled as indicated at 31 to assist in the crossover movements of the switch 18' and roller 14 just described.

In order that the anti-friction roller 14 may be effective and that is shall not be interfered with by the switch 18' I make the roller of a little greater diameter than the thickness of the switch, as represented in Fig. 10, and set the roller upon a reduced part 32 of the supporting pin 23, and in a socket 33 formed therefor in the switch 18'. This socket does not extend entirely through the switch, as shown by Fig. 9, the switch having bearing upon the pin 23 to the rear of the roller 14, that is, between the latter and the shaft 8.

This construction, which for some purposes I prefer to that shown in Figs. 1 to 5, permits the driving shaft to be turned in either direction and imparts alternate rotative movements to the driven shaft 4, whichever way the shaft be turned. It will be seen that this is due to the fact that the means employed for causing the lateral shifting movements of the roller 14 are homologous as approached from either direction. The engagement of the roller 14 with the opposite walls of the tracks maintains the driving gears in steady working engagement, and in the arrangement illustrated in Figs. 9 and 10, permits the roller 14 thus to function, even though the directing switch 18' be mounted upon the same support as the roller.

What I claim is:

1. The combination of a driven shaft carrying a bevel gear, a pair of bevel drive gears, a shaft to which the drive gears are fixed so they move together, the shaft being so mounted that it is free to move longitudinally to bring one or the other of the gears it carries into working engagement with the gear on the driven shaft, means for turning the shaft carrying the drive gears, a projection carried by the shaft, and means with which the projection engages arranged to intermittently shift the shaft laterally and bring the drive wheels alternately into working engagement with the driven wheel, whereby the latter and its shaft are reversed by the continuous rotation of the driven shaft.

2. The combination stated in claim 1 comprising a casing surrounding the portion of the shaft carrying the projection formed with two tracks for the projection located side by side, and means for shifting the projection laterally from one track to the other.

3. The combination stated in claim 1 comprising a casing surrounding the portion of the shaft carrying the projection having a partition surrounding the shaft in which is formed a crossover opening to permit the projection to pass from one side thereof to the other, and means for directing the projection through the said crossover opening alternately from one side of the partition to the other as the drive shaft is rotated.

4. The combination stated in claim 1, comprising a casing surrounding the portion of the shaft carrying the projection, which casing is divided by a partition into two tracks for the projection surrounding the shaft, there being a crossover opening through the partition connecting the tracks, and cams with which the projection carried by the shaft engage located adjacent to the said crossover opening and arranged to move the shaft so that the projection will be caused to travel alternately in the two tracks.

5. The combination stated in claim 4, comprising a switch for directing the crossover movements of the projection.

6. The combination stated in claim 3, the means for directing the projection through the crossover opening consisting of a shuttle-shaped switch mounted upon the same support as the projection, arranged to co-operate in directing the projection from one track to the other.

7. In alternating rotating gearing, the combination of a rotary shaft, an anti-friction roller carried by the shaft on a support radial to the latter, a casing surrounding the portion of the shaft carrying the roller, the casing being divided by a partition into two tracks through which is an opening permitting the roller to cross over from one track to the other, the tracks being of such width that the roller engages with the opposite walls thereof as it passes along them, and a pivoted switch arranged to assist in directing the roller through the crossover opening from one track to the other, mounted upon the same support as the roller.

8. The combination stated in claim 9 when the diameter of the roller is greater than the transverse diameter of the directing switch and the roller is seated in a recess formed in one face of the switch.

FRANK E. WILLIAMSON.